US006519595B1

(12) United States Patent
Rose (10) Patent No.: US 6,519,595 B1
(45) Date of Patent: Feb. 11, 2003

(54) ADMISSION CONTROL, QUEUE MANAGEMENT, AND SHAPING/ SCHEDULING FOR FLOWS

(75) Inventor: Forrest L. Rose, Oceanside, CA (US)

(73) Assignee: NMS Communications, Inc., Framingham, MA (US)

( * ) Notice: Subject to any disclaimer, the term of this patent is extended or adjusted under 35 U.S.C. 154(b) by 0 days.

(21) Appl. No.: 09/261,039

(22) Filed: Mar. 2, 1999

(51) Int. Cl.[7] .............................................. G06F 17/30
(52) U.S. Cl. .................. 707/10; 707/104.1; 707/200; 709/224; 709/209; 370/398
(58) Field of Search ........................ 707/200, 10, 104.1; 370/232, 233, 230, 389, 398, 414, 503; 187/383, 385; 709/229, 230, 231, 239, 240, 241, 242, 243, 244, 224, 202

(56) References Cited

U.S. PATENT DOCUMENTS

| | | | | | |
|---|---|---|---|---|---|
| 4,893,307 A | * | 1/1990 | McKay et al. | ............... | 370/389 |
| 5,021,949 A | * | 6/1991 | Morten et al. | ............... | 709/231 |
| 5,845,081 A | * | 12/1998 | Ranjarajan et al. | ......... | 709/224 |
| 5,850,395 A | * | 12/1998 | Hauser et al. | ............... | 370/398 |
| 6,085,221 A | * | 7/2000 | Graf | ............................ | 709/202 |
| 6,163,807 A | * | 12/2000 | Hodgkinson et al. | ....... | 709/229 |
| 6,216,127 B1 | * | 4/2001 | Gans et al. | .................... | 707/10 |

OTHER PUBLICATIONS

Subhash Suri et al., Leap Forward Virtual Clock: A New Fair Queuing Scheme with Guaranteed Delays and Throughput Fairness, Washington University, Department of Computer Science, Oct. 27, 1997, 1–35.

"Fast and Scalable Layer Four Switching", V. Srinivasan et al., Computer Communications Review, Oct. 1998.

"Small Forwarding Tables for Fast Routing Lookups", Mikael Degermark et al., Department of Computer Science and Electrical Engineering, Computer Communications Review, Oct. 1998.

"Leap Forward Virtual Clock", S. Suri et al, A New Fair Queuing Scheme w/Guarantted Delays & Throughput Fairness, Washington Univ., Dept. of Computer Science Oct. 27, 1997, 1–35.

"Practical Algorithm to Retrieve Information Coded in Alfanumeric," Journal of the ACM, Oct. 1968.

* cited by examiner

Primary Examiner—Diane Mizrahi
(74) Attorney, Agent, or Firm—Irell & Manella, LLP (57) ABSTRACT

A method and apparatus for providing admission control, queue management, and shaping/scheduling of flows in a communication device is described. In one embodiment, the communication device is a quality of service access communications device having a central processing unit and a memory module. The communication device includes a queuing module having a receive segment, a control segment, and a transmit segment. The transmit segment includes a fly-by flow admission control block that performs admission control of flows. The transmit segment further includes a two-tiered hierarchical shaper/scheduler block having a level-1 shaper/scheduler and a plurality of level-2 shaper/schedulers for shaping and scheduling of flows.

21 Claims, 11 Drawing Sheets

ADMISSION CONTROL, QUEUE MANAGEMENT, AND SHAPING/ SCHEDULING FOR FLOWS

BACKGROUND OF THE INVENTION

1. Field of the Invention

The present invention relates generally to communication devices, and specifically, to admission control, queue management, and shaping/scheduling of flows in such communication devices.

2. Background Information

Small and medium businesses typically have networks comprised of local area networks ("LANs"), ranging between 10 Mega-bits per second ("Mbps") to 100 Mbps, that carry information between stations for a wide range of applications. The applications can include a mixture of voice, video, interactive, web browsing, file transfers, etc., each of which has different requirements for bandwidth, latency, jitter, and data loss to ensure quality communication. The internal office LANs can either provide sufficient bandwidth or are economically upgradable to provide an order of magnitude increase in bandwidth.

The connection to a wide area network ("WAN") is however another matter. The bandwidth is not easily upgradable due to the cost of WAN access circuits. Various queuing techniques have been employed in WAN access equipment in attempts to provide sharing of the limited circuit bandwidth among the different types of data. These queuing techniques typically have limited applications and undesirable characteristics. For example, in one queuing technique, queues are serviced in strict priority order, which tends to starve low priority data types. Another technique, called Weighted Fair Queuing ("WFQ") solves the starvation effects. However, WFQ is computationally intensive, exhibits short term "unfairness", and does not provide guaranteed bandwidth, delay bound, or jitter bound characteristics for data types that need these characteristics.

SUMMARY OF THE INVENTION

The present invention is a method and apparatus for providing shaping/scheduling for flows. In one embodiment, a method of shaping/scheduling flows includes determining an arrival rate of a data unit associated with a flow, transferring the flow in a peak rate queue if the data unit arrives at a greater rate than a permissible peak rate, transferring the flow in an allocated rate queue if the data unit arrives at a greater rate than an allocated rate but less than the permissible peak rate; or otherwise transferring the flow in an output queue if the data unit arrives at a rate less than the allocated rate.

DETAILED DESCRIPTION

Figure 1:
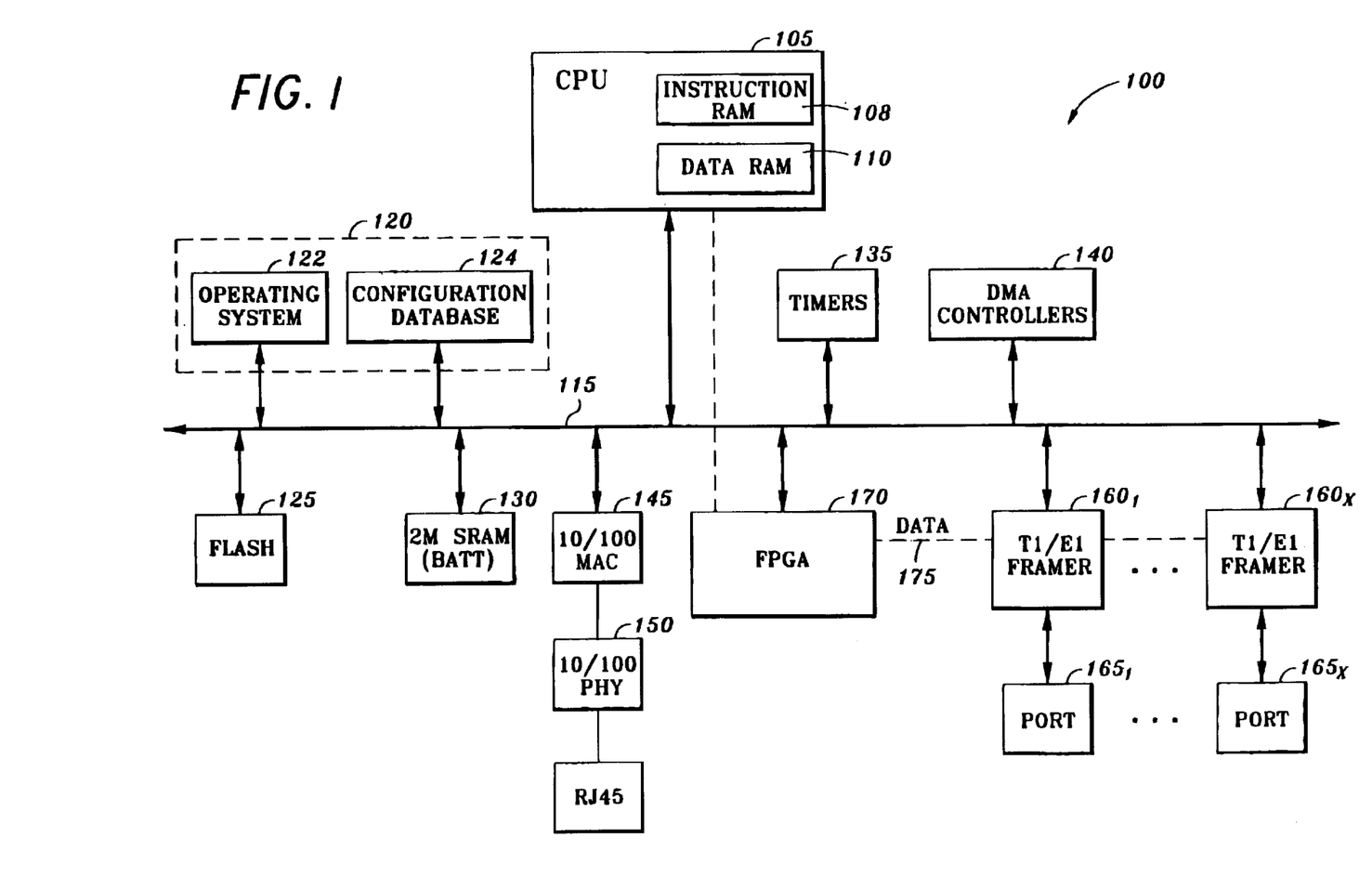
FIG. 1 illustrates an embodiment of a communication device suitable for use with embodiments of the present invention.

FIG. 1 illustrates an embodiment of a communication device 100 suitable for use with embodiments of the present invention. In one embodiment, the communication device 100 is a quality of service access communications device. Referring to FIG. 1, the communication device 100 includes a central processing unit ("CPU") 105 such as a microprocessor, microcontroller, or digital signal processor having on chip instruction and data memory 108 and 110 (e.g., static random access memory "SRAM"), which are cache-like devices. The CPU 105 is coupled to a plurality of devices by way of a system bus 115. In particular, the CPU 105 is coupled to an external memory 120 (e.g., Synchronous Burst SRAM, Synchronous Dynamic RAM, etc., or a combination of such devices), a FLASH memory device 125 (e.g., 8 Mbytes) for downloading program information, and a battery backup SRAM 130 (e.g., 2 Mbytes).

In addition, a number of input/output ("I/O") devices are coupled to the bus 115, including an Ethernet media access control ("MAC") port 145 for receiving/transmitting data packets from/to a physical interface 150 and a plurality of T1/E1 framers $160_1$–$160_X$ (where "X" is a positive whole number) for receiving/transmitting asynchronous transfer mode ("ATM") cells and frames from/to respective I/O ports $165_1$–$165_X$. A field programmable gate array ("FPGA") 170 is coupled to the bus 115. The FPGA 170 is also coupled to the T1/E1 framers $160_1$–$160_X$ and the CPU 105 by way of a serial bus 175. The control path of the T1/E1 framers $160_1$–$160_X$ and the FPGA 170 is through the bus for configuring and reading status information from the devices. The data path (e.g., ATM cells, frames, etc.) to/from the ports is provided though the serial bus 175. That is, data received from a port is transmitted to the CPU 105 through the FPGA 170 by way of the serial bus 175, and data is transmitted to a port from the CPU 105, though the FPGA 170 by way of the serial bus 175.

Also coupled to the bus 115 are general purpose timers 135, which are used for generating periodic interrupts, and direct memory access ("DMA") controllers 140 for transferring data from memory to memory, from the Ethernet MAC port buffer to memory, etc.

When the communication device 100 is powered up, an operating system 122 is loaded into memory 120 and/or the instruction cache 108 from a non-volatile storage device (e.g., FLASH 125) or a mass storage device such as a hard disk drive (not shown). Also loaded into memory 120 and/or the data cache 110 is a configuration database 124 having configuration information on virtual path connections ("VPCs") and virtual circuit connections ("VCCs") established for each user network interface ("UNI"). Thus, a user or organization wanting to communicate over a wide area network ("WAN") will lease VPC and/or VCC services from a communication carrier. The communication carrier then establishes the VPC and/or VCC services for each UNI into the communication device 100.

A UNI is hereinafter used interchangeably with a port, with each port having one or more physical links. As discussed herein, a "data unit" refers to a packet, frame, or cell. A "flow" is defined as a uniquely identified stream of data units. Through inspection of data unit headers, the data units are categorized and classified to constitute a uniquely identified flow. In one embodiment, a flow is either a level-1 flow or a level-2 flow. Moreover, flows may be aggregated such that they are processed and managed as one aggregate flow. Thus, any reference to a flow refers to a flow or a flow aggregate. Processing and management of a flow includes allocating resources for the flow. Examples of resource allocation include link bandwidth allocation and node buffer allocation for a flow. An example of processing includes encapsulation of Internet Protocol ("IP") datagrams with ATM request for comment ("RFC") 1483 encapsulation, entitled "Multiprotocol Encapsulation over ATM Adaptation Layer 5", published in July 1993. A protocol or protocol layer is hereinafter defined as a protocol that can be mapped into the Open System Interconnection ("OSI") layer model.

Figure 2:
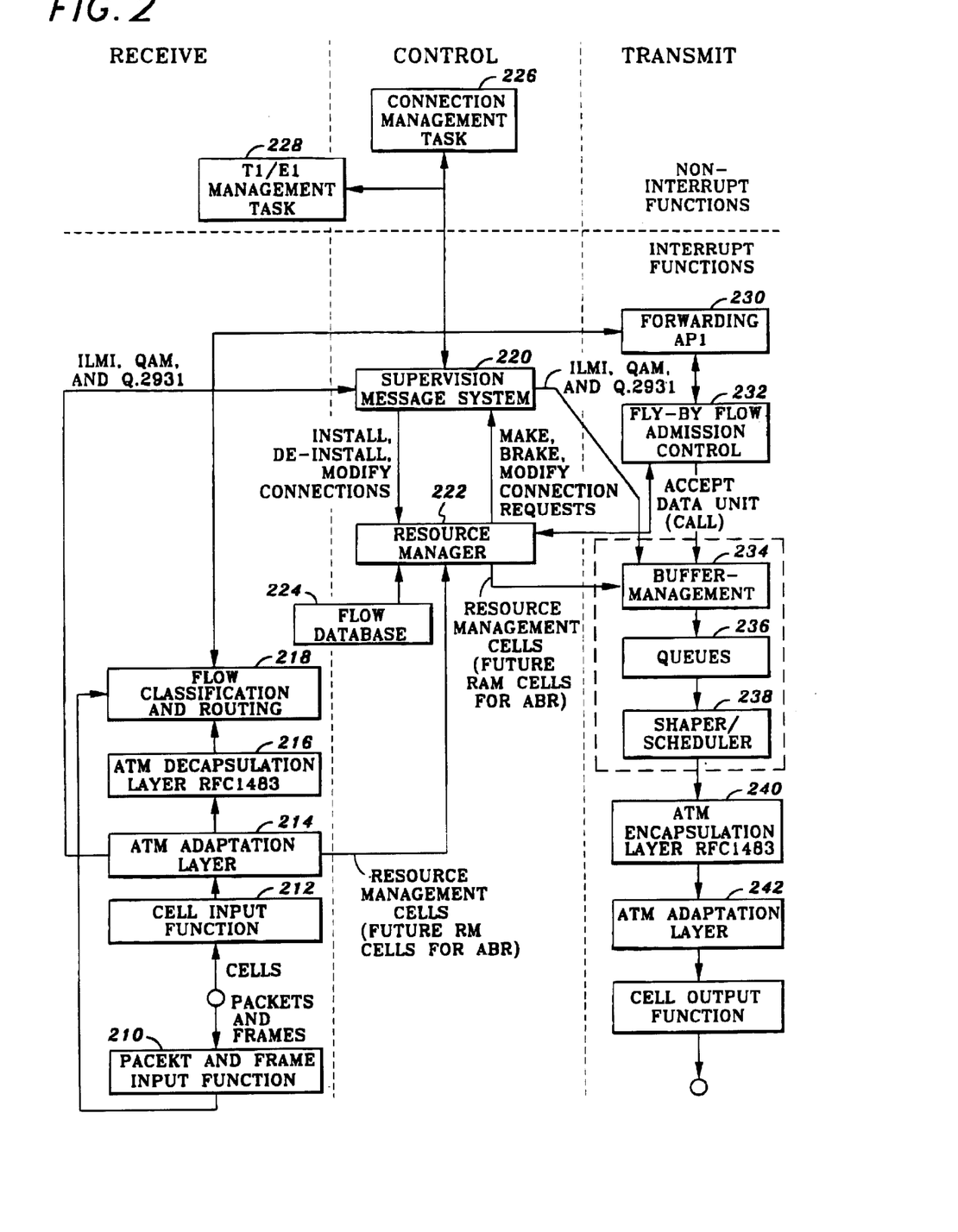
FIG. 2 illustrates functional blocks within a queuing module according to one embodiment of the present invention.

FIG. 2 illustrates functional blocks within a queuing module 200 implemented on the communication device 100 according to one embodiment of the present invention. Referring to FIG. 2, the functional blocks are broken up into three vertical segments, namely, receive, control, and transmit, and two horizontal segments, namely non-interrupt and interrupt functions. In one embodiment, the queuing module 200 is implemented in software, in which case, the queuing module 200 or portions thereof is contained in the memory 120 and/or internal memory 108 of the CPU 105, and is executed by the CPU 105 (FIG. 1).

Receive Segment

In the receive segment, packets and frames such as, for example, IP packets, Ethernet frames, and frame relay frames are received by a packet/frame input function 210. The input function 210 performs preliminary filtering and cyclic redundancy checking ("CRC") on the packets and frames. The packets and frames are then forwarded to a flow classification and routing block 218.

ATM cells are received by a cell input function 212. The cell input function 212 determines whether there is an existing connection for the cell stream. The cells are then passed to an adaptation layer processing block 214 where the cells are converted to contiguous protocol data units ("PDUs") using, for example, ATM adaptation layer 5 ("AAL5"). The adaptation layer processing block 214 also detects Integrated Local Management Interface ("ILMI"), Operations, Administration, and Maintenance ("OAM"), and signaling cells, and passes them directly to a supervision message system block 220 for setting up/tearing down connections, etc. In addition, the adaptation layer processing block 214 detects resource management cells relating to flow control (e.g., ATM available bit rate "ABR" RM cells, etc.), and passes these cells to a resource manager block 222 which then slows down or speeds up an existing flow in response to the management cells. After each PDU is reconstructed, it is passed to an ATM decapsulation layer block 216 where PDUs are decapsulated into data units using RFC 1483. The ATM decapsulation layer block 216 then forwards the data units to the flow classification and routing block 218.

The flow classification and routing block 218 determines whether a flow has been set up for an incoming data unit, and determines the class of traffic that the flow is assigned. If a flow has been set up for the packet, the packet and an associated Flow ID are transmitted to a forwarding block 230 in the transmit segment. The Flow ID includes several components including a destination link, the shaping/scheduling parameters of the flow, the quality of service ("QoS") parameters assigned to the flow, etc. Assignment of the Flow ID is dependent on the classification of the flow. The class assigned to the flow determines the QoS to be provided for that flow. In one embodiment, the Flow ID is an address pointing to a memory location where the aforementioned parameters are located. If a flow has not been assigned to the packet, the packet is sent to the forwarding block 230 with a request that a flow be created for the packet at a desired QoS. An embodiment of the flow classification and routing block 218 is described in co-pending U.S. patent application Ser. No. 09/261,061, entitled "Apparatus and Method for Classifying Information Received by a Communications System," and now U.S. Pat. No. 6,295,532 filed Mar. 2, 1999, and assigned to the assignee of the present invention, the contents of which are incorporated herein by reference.

In the case of VPC service, the VPCs are ordered and leased from a service provider. The VPC configuration associated with the VPC service ordered is then placed in the configuration database 124 of the communication device 100 (FIG. 1). The VPC may be manually configured, or automatically configured using protocols such as ILMI. In response to the VPCs ordered, the queuing module 200 sets up level-1 flows for the VPCs. Flow classification and policy definitions determine how to identify one protocol stream from another, in addition to the QoS parameters required to support each stream. As data units are received on an interface for a class where a flow has not been established, a level-2 flow is requested from a fly-by flow admission control block 232 via a forwarding application program interface ("API") block 230 based upon the flow classification and policy definition. When a level-2 flow is requested, it is requested with a corresponding level-1 Flow ID that was created by the user configuration. The flow classification and routing block 218 use the configuration to determine routes and the set of level-1 flows available to make level-2 flows. Each level-2 flow created is assigned a level-2 Flow ID and a VCC. The VCC assignment allows flows to be multiplexed at the cell level (e.g., one cell from one flow followed by one cell from another flow).

In the case of VCC service, the VCCs are also ordered and leased from the service provider. The VCC configuration associated with the VCC service ordered is then placed in the configuration database 124 of the communication device 100 (FIG. 1). This can be manually, or automatically configured using protocols such as ILMI. In response to the VCCs ordered, the queuing module 200 sets up level-1 flows for the VCCs. Flow classification and policy definitions determine how to identify one protocol stream from another and determine the QoS parameters required to support each stream. As data units are received on an interface for a class where a flow has not been established, a level-2 flow is requested from the fly-by flow admission control block 232 via the forwarding API block 230 based upon the flow classification and policy definition. When a level-2 flow is requested, it is requested with a corresponding level-1 Flow ID that was created by the user configuration. The flow classification and routing block 218 uses the configuration to determine routes and the set of level-1 flows available to make level-2 flows. Each level-2 flow created is assigned a Flow ID. VCC service does not assign VCCs to flows as in the VPC service. However, data structures for flow state machines are created and initialized as in VPC service. With VCC service, flows are multiplexed at the packet level (e.g., when a flow is chosen for output service, all segments of the packet are transmitted in consecutive succession before another flow is serviced).

Control Segment

In the control segment, a connection management task 226 (e.g., an ATM management task) and a physical interface management task 228 are provided and run with/on the operating system 122 (FIG. 1). These tasks operate in the non-interrupt code space and communicate with the resource manager 222 by way of an API using the supervision message system 220. The API is used to pass messages (e.g., LMI, OAM, and signaling information) between the tasks and the WAN interface. The resource manager 222 sends requests for establishing, terminating, and modifying connections to the connection management task 226. The connection management task 226 responds to such requests directing the resource manager 222 to install, de-install, or modify the connections. The physical layer management task 228 communicates with the resource manager 222, notifying the latter of the (up/down) status of physical ports. The LMI, OAM, and signaling messages passed back to the supervision message system 220 from the connection management task 226 are sent directly to a buffer management block 234 for queuing in queues 236, and subsequent output.

The resource manager 222 handles the installation, de-installation, and modification of flows. This includes handling and generating resource management data to control the data rate for flow controlled connections such as, for example, ATM ABR. The resource manager 222 is also responsible for mapping class and policy definitions for the flows. Such class and policy definitions include resource requirements (e.g., bandwidth, peak rate limits, buffer delay, and jitter). Moreover, the resource manager 222 assigns pre-established VCCs and flow state machine data structures for VPC service due to the activation/deactivation of the flows (e.g., layer-3 to layer-7 protocol flows such as IP). Activation of flows occurs upon data unit arrivals, or signaling protocols (e.g., ATM SVC Signaling or Resource RerserVation Protocol "RSVP") that require a flow be established. Deactivation of flows occurs upon timeouts for flows (e.g., data unit arrivals not received for a predetermined amount of time), or by signaling protocols such as ATM SVC signaling and RSVP. The resource manager 222 is coupled to a flow database 224 which contains the current resource state (e.g., available bandwidth for allocation, available buffers for allocation, etc.).

In addition, the flow database 224 includes other parameters and state variables including, but not limited or restricted to, Flow ID used to map, for example, a layer-3 protocol (e.g., IP) classified flow into a level-2 VCC, connection shaping parameters and state (e.g., QoS parameters such as peak and sustained bandwidth, maximum queuing delay, maximum burst size, etc.), and connection scheduling parameters and state (e.g., sustained rate). The resource manager 222 allocates resources for flows and keeps track of remaining resources using the flow database 224. It determines whether resources can be allocated to flows and reclaims resources for flows no longer active.

In the case of ATM, an example of a resource request to the resource manager 222 may include the following:

(1) ATM connection index;
(2) ATM connection type (VPC or VCC);
(3) Virtual path identifier ("VPI");
(4) Virtual connection identifier ("VCI");
(5) Traffic contract (e.g., ABR, UBR, VBR, CBR, GFR);
(6) Peak cell rate ("PCR");
(7) Sustained cell rate ("SCR");
(8) Minimum cell rate ("MCR");
(9) Maximum cell burst size ("MBS");
(10) Associated routing virtual interface number;
(11) Associated UNI number;
(12) Buffer allocation (e.g., number of buffers);
(13) ATM VCC endpoint function assignment (e.g., AAL5, AAL2, ILMI);
(14) Encapsulation Type (e.g., 1483, null, etc.);
(15) Hierarchy Level-1 assignment (VPC, VCC);
(16) Hierarchy Level-2 assignment (VCC, AAL2VCC, AAL5 packet mode VCC); and
(17) Range of VCIs available within VPC (for VPC service).

The connection management task 226, upon initialization, interfaces with the operating system 122 running on the communication device 100 and reads the configuration information in the connection database 124 to install the user configurations (FIG. 1). If there is a VPC service to be configured, the connection management task 226 issues a request to the resource manager block 222 to install a level-1 flow (and requests a QoS) for the VPC. The resource manager block 222 then establishes a level-1 flow and assigns resources to the flow. The resource manager block 222 then sends a deny or confirmation message and a Flow ID back to the connection management task block 226. A deny message indicates that there are insufficient resources available if the request indicated to deny in the case of insufficient resources. A confirmation message indicates that there were either sufficient resources and a flow assigned, or insufficient resources (e.g., less than requested resources) and a flow assigned. A similar protocol is performed for VCC service. The connection management task block 226 then notifies the flow classification and routing block 218 of the set of VPCs and VCCs (level-1 flows) that are set up to be used by sending the Flow IDs of the VPCs and VCCs to the same.

Transmit Segment

In the transmit segment, the forwarding API block 230 passes data units, Flow IDs, and/or requests for assignment of Flow IDs and QoS from the flow classification and routing block 218 to a fly-by flow admission control block 232. The fly-by flow admission control block 232 performs admission control for data unit arrivals for which there is no assigned flow. This is required due to the connectionless nature of many protocol layers (e.g., IP). For support of packet classifications, the fly-by flow admission control block 230 interacts with the flow classification and routing block 218 to map protocol layer flows to level-1 or level-2 flows.

At initialization, the connection management task 226 creates pre-configured level-2 flows between the source and destination node on which it can map a layer protocol flow to the level-2 flow (e.g., mapping a new layer-3 protocol such as IP, or a layer-2 protocol such as frame relay or PPP to a level-2 flow). Each pre-configured level-2 flow is initially setup without any QoS parameters assigned to it.

The flow classification and routing block 218 passes data units and their corresponding Flow IDs to the fly-by flow admission control block 232 for existing flows. The fly-by flow admission control block 232 then forwards the data units to the buffer management block 234 for queuing.

To establish a new flow, the flow classification and routing block 218 passes a resource request to the fly-by flow admission block 232 for the QoS parameters for a new flow. QoS parameters include, but are not limited or restricted to, peak rate, sustained rate, delay, jitter, and maximum burst size. In response to the resource request, the fly-by flow block 232 attempts to acquire resources for the flow by sending a request to the resource manager 222. The resource manager 222 determines whether there are sufficient resources such as bandwidth, buffers, connection identifiers, delay bounded routes, etc. to meet the desired QoS associated with the flow, as indicated by the policy associated with the class. If sufficient resources exist, the fly-by flow admission block 232 is notified to acquire a level-2 flow out of a pool of available level-2 flows that have not been assigned to protocol layers (e.g., layer-2 or layer-3 classified flows). The fly-by flow admission block 232 then assigns to the level-2 flow, the QoS parameters requested by the flow classification and routing block 218 in the QoS request. The data unit is then forwarded to the buffer management block 234 for queuing. Consequently, the level-2 flow is active and able to accept and queue data units. If there are insufficient resources, the flow may be denied or accepted on an "all-others" flow (e.g., lower priority flow) as predetermined by user configuration control.

When flow classification and routing block 218 wishes to terminate the protocol layer flow, it requests the resource manager 222 to deactivate the level-2 flow. All resources that were used by the level-2 flow are returned to the resource pool and the flow is deactivated. When deactivated, the level-2 flow is no longer available to be used until it is reassigned to a new layer-3 or layer-2 flow.

The fly-by flow admission control block 232 has the advantage over explicit out-of-band flow establishment procedures such as ATM signaling or RSVP in that the data unit is not delayed by the out-of-band flow establishment process that requires communication between networking devices. Thus, with the fly-by flow admission block 232, the first data unit to establish a flow is not delayed and can be immediately forwarded to the network port. This makes applications such as Voice over IP a reality in the WAN.

Resources assigned to level-1 flows can be partitioned for purposes of limiting access. The sum of the resource partitions is equal to the resource assignment to the level-1 flow. For example, a level-1 flow may have two resource partitions, one for agency A and one for agency B (e.g., for separate LAN networks). Through flow classification, data units can be identified as being members of agency A or B. Thus, when a new data unit stream is identified, the new flow is created from the resource partition assigned to that classification type. In this way, agency A can be limited in the amount of resources that are drawn from the level-1 flow so as not to block resources from being allocated to flows belonging to agency B. Likewise, agency B has its own resource partition to draw from as not to block agency A.

Once a flow has been established, the buffer-management block 234 determines whether the queue has sufficient space for the data unit. If not, the data unit is discarded. If so, the data unit is queued in the data unit queues 236 associated with the flow. A queue is assigned to each flow. The queue operates as a FIFO and can accept packet, frames, and cells.

Queues/buffers are allocated for each VPC, VCC, or UNI. This is used to prevent connections from depleting the buffer pool thus blocking other connections from being able to queue data for transmission. It can also be used to bound the queuing delay for a flow. A flow only uses the buffers allocated to the associated VPC, VCC, or UNI. If a flow depletes its buffer allocation, even though there are available buffers in the system, the data unit is discarded. For cases where there are a relatively large number of connections and/or interfaces, buffer allocation can be configured so that the buffers are over-allocated. This results in more buffers being available on a statistical basis with a chance that a flow might not at times be able to use its allocation. For example, 10,000 buffers are allocated to a UNI. As long as a majority of the connections are idle or have not used their entire buffer allocation, active connections can queue more packets and cells than if their buffer allocation were limited to 100 buffers.

The queues 236 are coupled to a two-tiered hierarchical shaper/scheduler block 238, having a hierarchy level-1 shaper/scheduler and a hierarchy level-2 shaper/scheduler, that selects a flow for service. If the packet arrives into a non-empty queue, the flow has already been scheduled and no further action is required. That is, once a packet is queued, the flow associated with the packet is sent to the shaper/scheduler block 238 for shaping and scheduling. The shaper/scheduler block 238 is invoked periodically to service the queues 236. When a flow is selected for output, the associated output adaptation processing assigned to the flow is performed and the data is delivered to an output port. For example, for ATM, the output function is the ATM encapsulation layer block 240 which applies the RFC 1483 header to the packet. The packet is then passed to the ATM adaptation layer block 242 which segments packets into cells and outputs the cells.

Figure 3:
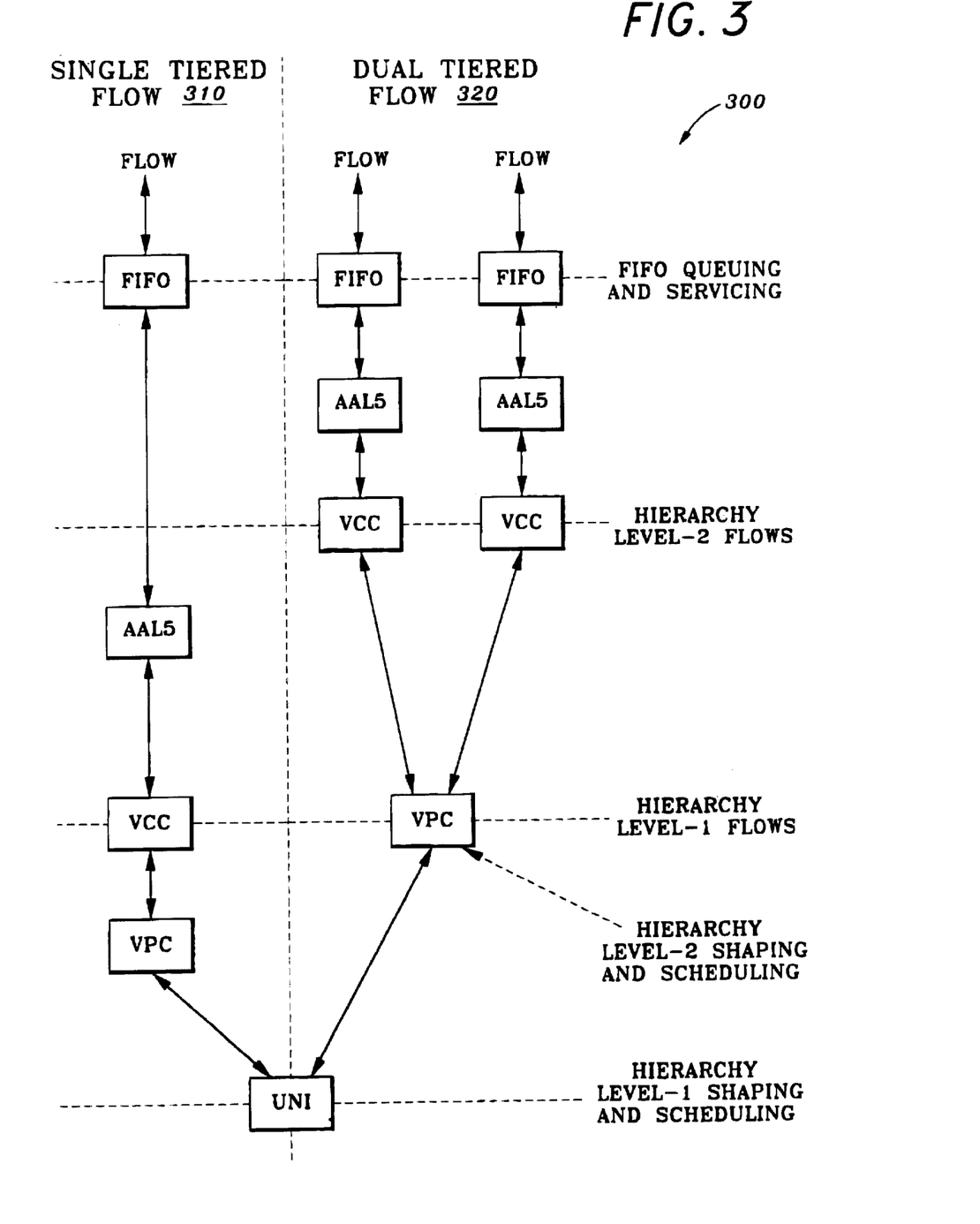
FIG. 3 illustrates a diagram of single and dual tiered flows on a UNI that are supported by the queuing module, according to one embodiment of the present invention.

FIG. 3 illustrates a diagram 300 of single and dual tiered flows on a UNI that are supported by the queuing module 200, according to one embodiment of the present invention. Referring to FIG. 3, the single tiered flow (column 310) is a level-1 flow without the ability to accept level-2 flows. The single tiered flow conserves memory and computational resources when there is no desire to carry multiple level-2 flows on a level-1 flow. This corresponds to VCC service, where a hierarchical level-1 shaper/scheduler is assigned to the UNI, and a single VCC is assigned to a level-1 flow. Flow data unit queues are assigned to the level-1 flow.

A hierarchical level-1 shaper/scheduler is used for VCC shaping and scheduling, and the hierarchical level-2 shaper/scheduler is used for packet shaping and scheduling. Thus, VCCs are mapped to level-1 flows (e.g., a layer protocol flow such as ATM), and layer protocol flows (e.g., IP) are mapped to level-2 flows. For VCC service with layer protocol flows, depending upon the ATM adaptation layer used (e.g. AAL5), all segments of a packet may or may not need to be sent out before a new flow can be selected for output service.

The dual tiered flow (column 320) is a level-1 flow with the ability to accept level-2 flows. This corresponds to VPC service, where a hierarchical level-1 shaper/scheduler is assigned to the UNI, and hierarchical level-2 shaper/schedulers are assigned to VPCs. For the dual tiered flow, the level-1 flow is assigned to a level-2 shaper/scheduler. The level-1 shaper/scheduler selects the level-1 flow for output service. In turn, the level-1 flow processes the level-2 shaper/scheduler that is assigned to it. Then, the level-2 shaper/scheduler selects a flow for output service and an output function (e.g., AAL5) is invoked to output a data unit.

In the case of VPC service, the hierarchical level-1 shaper/scheduler is used for VPC shaping and scheduling, and a hierarchical level-2 shaper/scheduler is used for VCC shaping and scheduling. VCCs within VPCs are assigned to the level-2 shaper/schedulers. Thus, this mode allows VCCs to be shaped and scheduled within VPCs. Level-2 flows are queued in level-2 shaper/schedulers, whereas level-1 flows are queued in level-1 shaper/schedulers. When a dual tiered flow is selected for service by a level-2 shaper/scheduler, the output function (e.g., AAL5) is invoked to output a data unit.

In addition to VPC and VCC services, other services may exist. For example, a hybrid service comprising of a combination of the VPC service and the VCC service may be offered on the same UNI. The single and dual tiered flows shown in FIG. 3 are thus illustrative and not intended as a limitation of the services supported.

Figure 4:
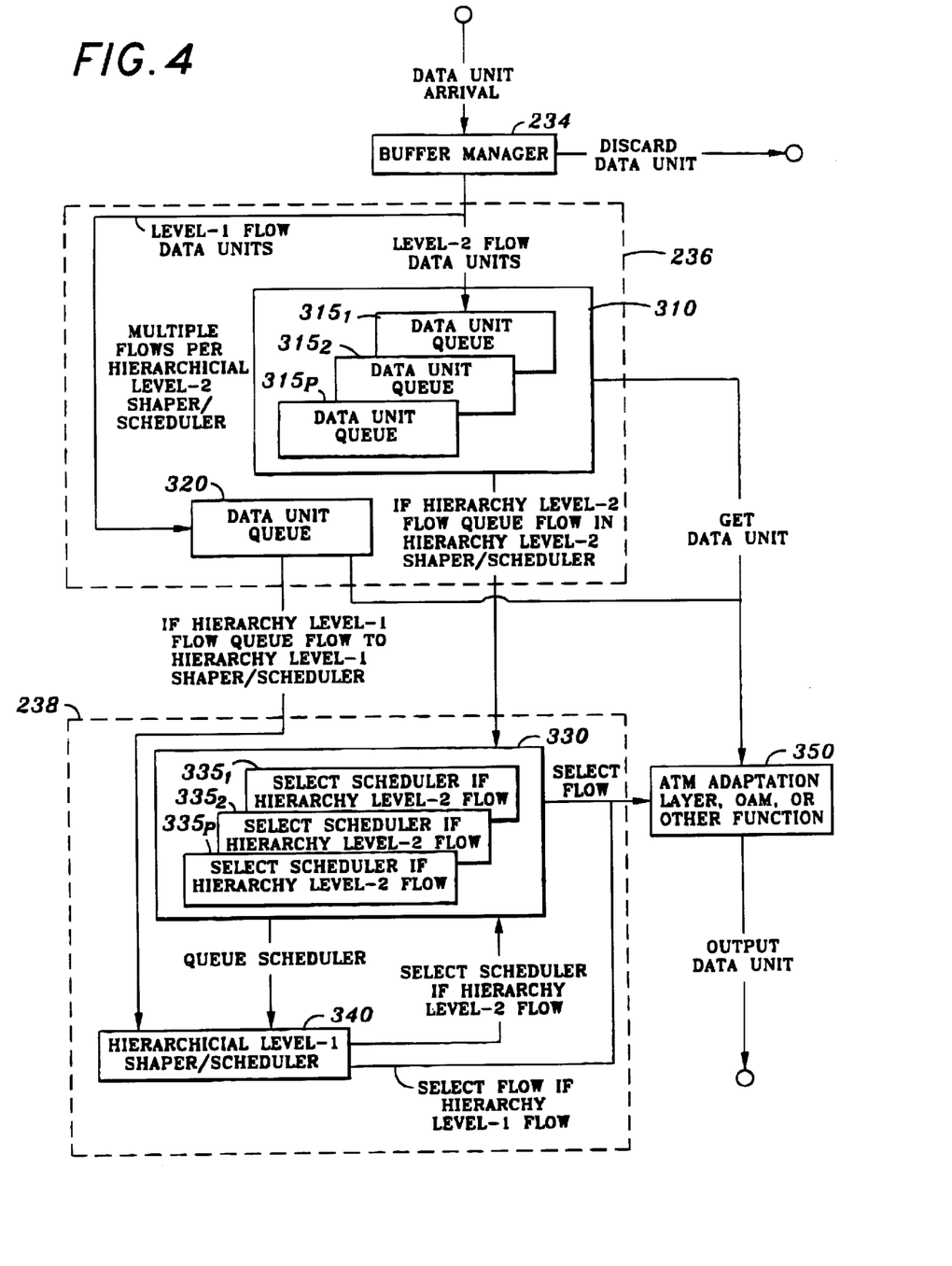
FIG. 4 illustrates a functional block diagram of a two-tiered hierarchical shaper/scheduler and buffer manager, according to one embodiment of the present invention.

FIG. 4 illustrates a functional block diagram of a two-tiered hierarchical shaper/scheduler and buffer manager, according to one embodiment of the present invention. Referring to FIG. 4, the two-tiered hierarchical shaper/scheduler and buffer manager includes the buffer management block 234, the queues block 236, and the two-tiered hierarchical shaper/scheduler block 238 of FIG. 2.

As data units arrive, the buffer-management block 234 queues the data units depending on whether there are available unallocated or sufficient allocated buffers for the associated VCC, VPC, and/or UNI. Otherwise, the buffer management block 234 discards the data units. If there are sufficient buffering capacity, the data units are queued in queues 236.

Figure 5:
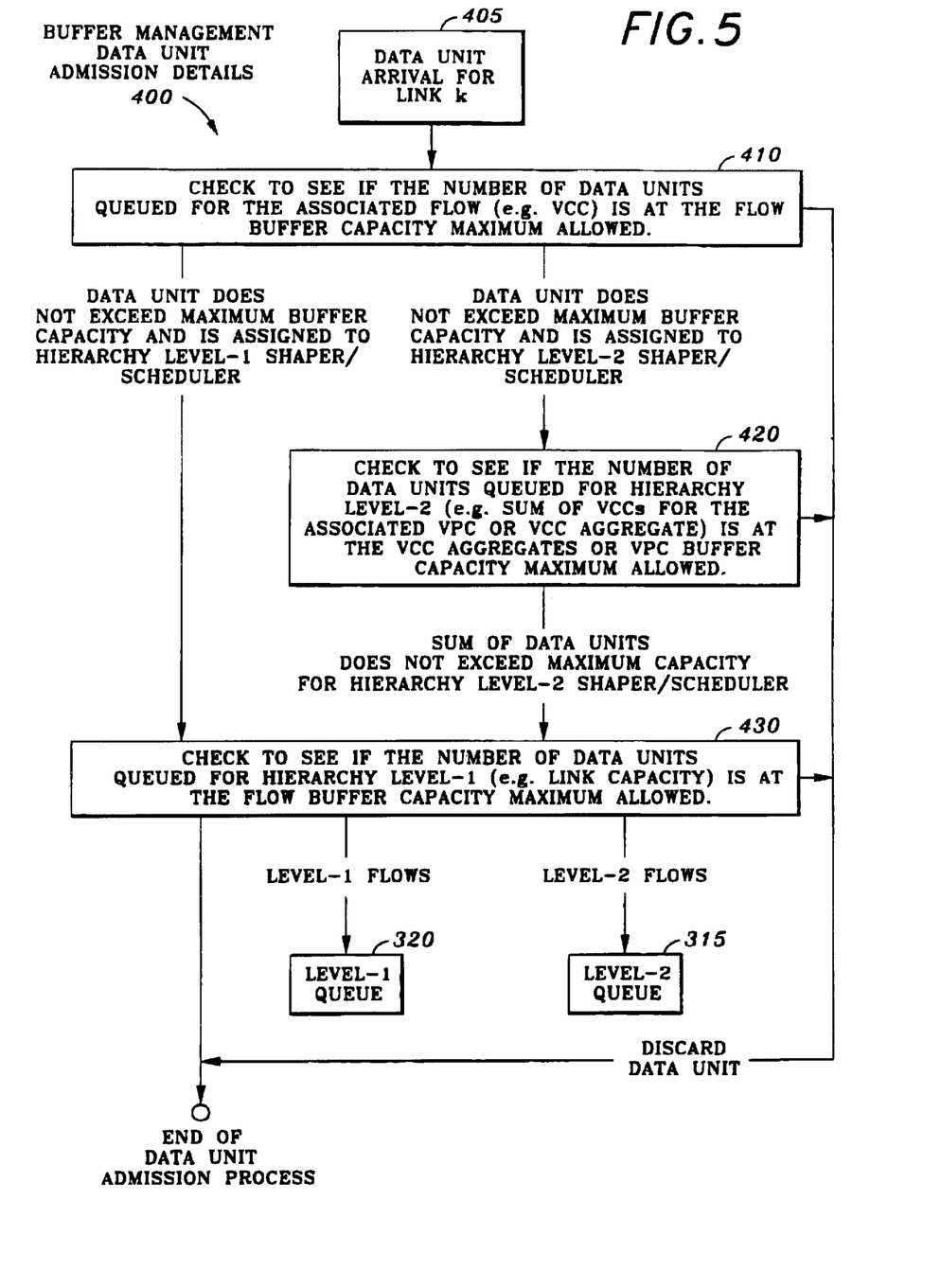
FIG. 5 illustrates a flow diagram of a buffer management method according to one embodiment of the present invention.

FIG. 5 illustrates a flow diagram of a buffer management method 400 according to one embodiment of the present invention. Referring to FIG. 5, at block 405, a data unit arrival occurs for transmission to link K. At block 410, a determination is made as to whether the number of data units queued for the associated flow (e.g., VCC) is below a maximum threshold. If not, the data unit is discarded. If the data unit does not exceed the maximum threshold for the flow, and the flow is assigned to a level-2 shaper/scheduler, the process moves to block 420. If the flow is assigned to the level-1 shaper/scheduler, the process moves to block 430. At block 420, a determination is made as to whether the number of data units queued for the hierarchy level-2 shaper/scheduler (e.g., sum of VCCs for the associated VPC or VCC aggregate) is below a VPC maximum threshold. If not, the data unit is discarded. If so, the process moves to block 430, where a further determination is made as to whether the number of data units queued for hierarchy level-1 (e.g., link capacity) is below a maximum link threshold. If not, the data unit is discarded. Otherwise, the data unit is queued in queues 236 (either the level-1 queue 320 or a level-2 queue 315).

Referring back to FIG. 4, The queues 236 include a plurality of level-2 queues $315_1$–$315_P$ and a level-1 queue 320. Data units admitted through the buffer manager 234 are placed in a level-2 queue or the level-1 queue. For each UNI, the two-tiered hierarchical shaper/scheduler 238 includes level-2 shaper/schedulers $335_1$–$335_P$, and a level-1 shaper/scheduler 340. Level-2 shaper/schedulers $335_1$–$335_P$ correspond to level-2 queues $315_1$–$315_P$. There is only one level-1 shaper/scheduler per UNI, and a plurality of level-2 shaper/schedulers per level-1 shaper/scheduler.

A UNI may be assigned to the level-1 shaper/scheduler 340, and a level-1 flow may be assigned to a level-2 shaper/scheduler 330. If the flow is a single tiered flow, it is queued in the level-1 shaper/scheduler 340. Similarly, if the flow is a level-2 flow of a dual tiered flow, it is queued in the level-2 shaper/scheduler 330. In turn, if not already scheduled, the level-2 shaper/scheduler 330 is queued in the level-1 shaper/scheduler 340. When it is time to transmit a packet, the level-1 shaper/scheduler 340 chooses a level-1 flow or a level-2 shaper/scheduler 330 that has the smallest timestamp deadline (discussed below). If the hierarchy level-1 shaper/scheduler 340 chooses a level-1 flow, the output function 350 (e.g., an ATM adaptation layer or OAM function) associated with the flow is invoked. The ATM adaptation layer or OAM function builds a cell's worth of data for subsequent transmission. If the level-1 shaper/scheduler 340 selects a level-2 shaper/scheduler 340, the level-2 shaper/scheduler selects a level-2 flow. Then, the ATM adaptation layer or OAM function 350 builds a cell's worth of data for subsequent transmission.

Shaping is a function of limiting the maximum rate at which data units can be transmitted for any given flow. For example, in the case of ATM traffic contracts, it is referred to as "leaky-bucket." For ATM, this is the peak cell rate of an unspecified bit rate ("UBR") traffic contract. Thus, if the link bandwidth is 1000 cells/sec and a UBR peak cell rate is 500 cells/sec, then shaping limits the cell rate for the connection to 500 cells/sec even if there is an offered load that exceeds the peak rate. If cells were transmitted at a rate greater than 500 cells/sec, the ATM Network might discard that portion of the traffic above the peak rate. Even though there is bandwidth available on the link, it is not necessarily utilized. This property makes shaping a non-work-conserving mechanism.

On the other hand, scheduling is a work-conserving mechanism. Unlike shaping, which applies to each flow, scheduling looks at all the flows and makes a determination as to which flow to service next and transmit a data unit from the flow. As long as there are data units queued, it selects a data unit to transmit every link data unit time. The selection of which data unit to transmit is based upon a scheduling discipline, as will be described in the following sections.

Figure 6:
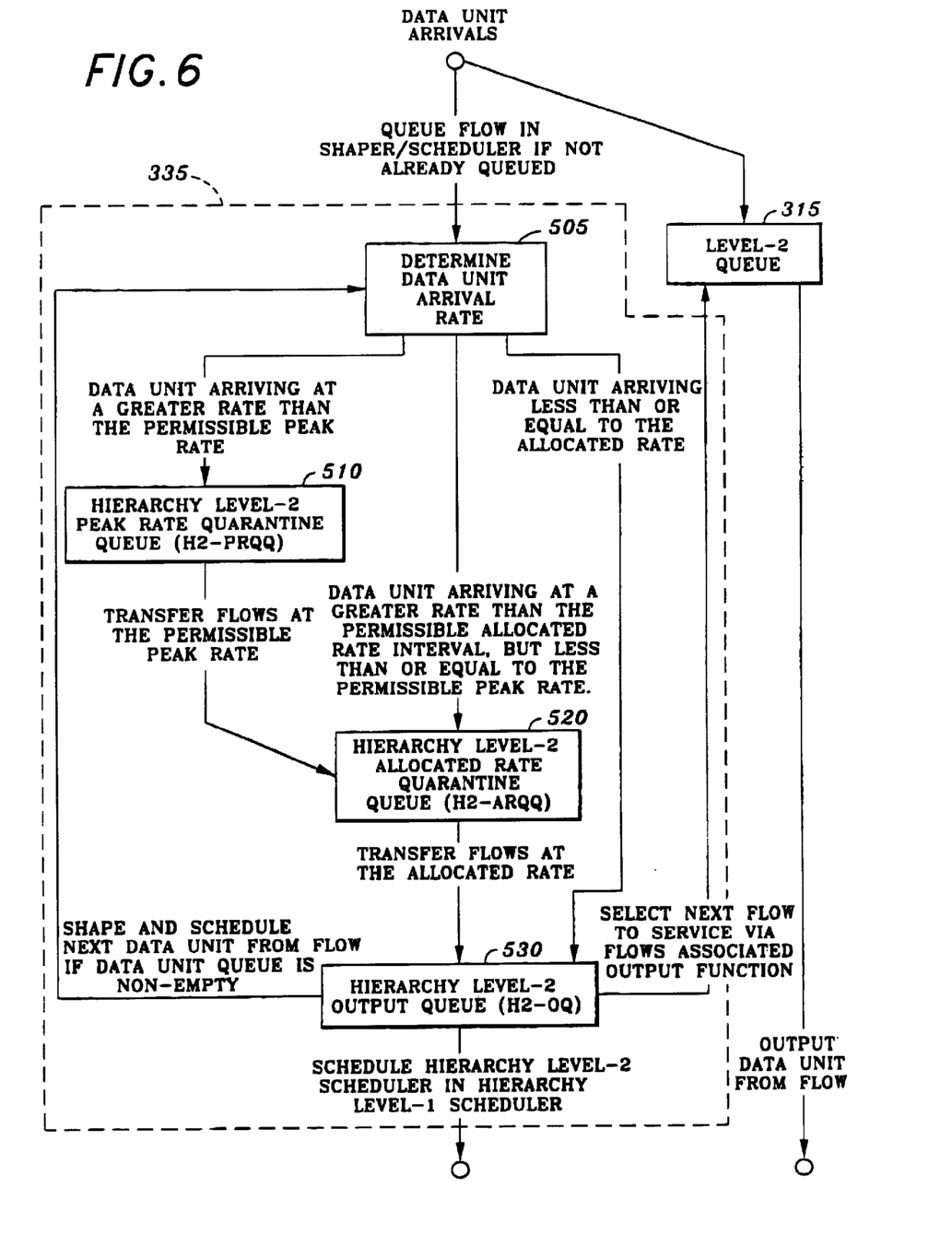
FIG. 6 illustrates a functional block diagram of a hierarchy level-2 shaper/scheduler and a corresponding level-2 flow queue according to one embodiment of the present invention.

FIG. 6 illustrates a functional block diagram of a hierarchy level-2 shaper/scheduler 335 and a corresponding level-2 flow queue 315 according to one embodiment of the present invention. Referring to FIG. 6, the level-2 shaper/scheduler 335 includes a hierarchy level-2 peak rate quarantine queue ("H2-PRQQ") 510, a hierarchy level-2 allocated rate quarantine queue ("H2-ARQQ") 520, and a hierarchy level-2 output queue 530 ("H2-OQ"). Data units are queued in the queue 315 as they arrive. In addition, the flow associated with the data unit is also queued in the level-2 shaper/scheduler 335 queues. If a data unit is received when the flow is already queued in the level-2 shaper/scheduler 335 queues, the data unit is queued in the level-2 queue 315 and no other action is performed.

If the flow associated with the data unit has not yet been queued, the flow is forwarded to block 505 where the data unit arrival rate is determined. The arrival rate is compared to the last data unit departure for the flow. If the comparison is less than or equal to the allocated rate for the flow as determined by comparison to the "no-rush" condition, the flow is queued in the H2-OQ 530. The "no-rush" condition is defined in Suri et al., entitled "Leap Forward Virtual Clock: A New Fair Queuing Scheme With Guaranteed Delays And Throughput Fairness", published by Washington University, Department of Computer Science, October 1997.

In Suri, the L and H queues are analogous to the H2-ARQQ 520 and H2-OQ 530, respectively, of FIG. 6.

If the comparison is less than or equal to the permissible peak rate for the flow, but greater than the allocated rate, the flow is queued in the H2-ARQQ 520. The flow is held in the H2-ARQQ 520 until the difference between the current flow timestamp and the last cell departure timestamp is equal to the allocated inter-cell rate as determined by comparison to the no-rush condition, at which time it is transferred to the H2-OQ 530. At block 505, if the comparison is greater than the permissible peak rate for the flow, the flow is queued in the H2-PRQQ 510. The flow is held in the H2-PRQQ 510 until the difference between the current flow timestamp and the last cell departure timestamp is equal to the permissible inter-cell peak rate at which time it is transferred to the H2-ARQQ 520. The H2-OQ 530 is serviced when selected by the level-1 shaper/scheduler 340 (FIG. 4). Flows compete for the next cell transmission time and the flow with the earliest timestamp deadline is the flow to be serviced. The flow is serviced by invoking the flow's output function to output a data unit. In the case of ATM, the output function gathers a cell's worth of data from the queue 315 for output. If the H2-OQ 530 ever transitions to empty, the server clock is advanced such that at least one flow in the H2-ARQQ 520 is eligible for transfer to the H2-OQ 530. When the output function is completed and the flow still has more data units to transmit, the flow is rescheduled for the next data unit, as shown by the arrow from the H2-OQ 530 to block 505.

Figure 7:
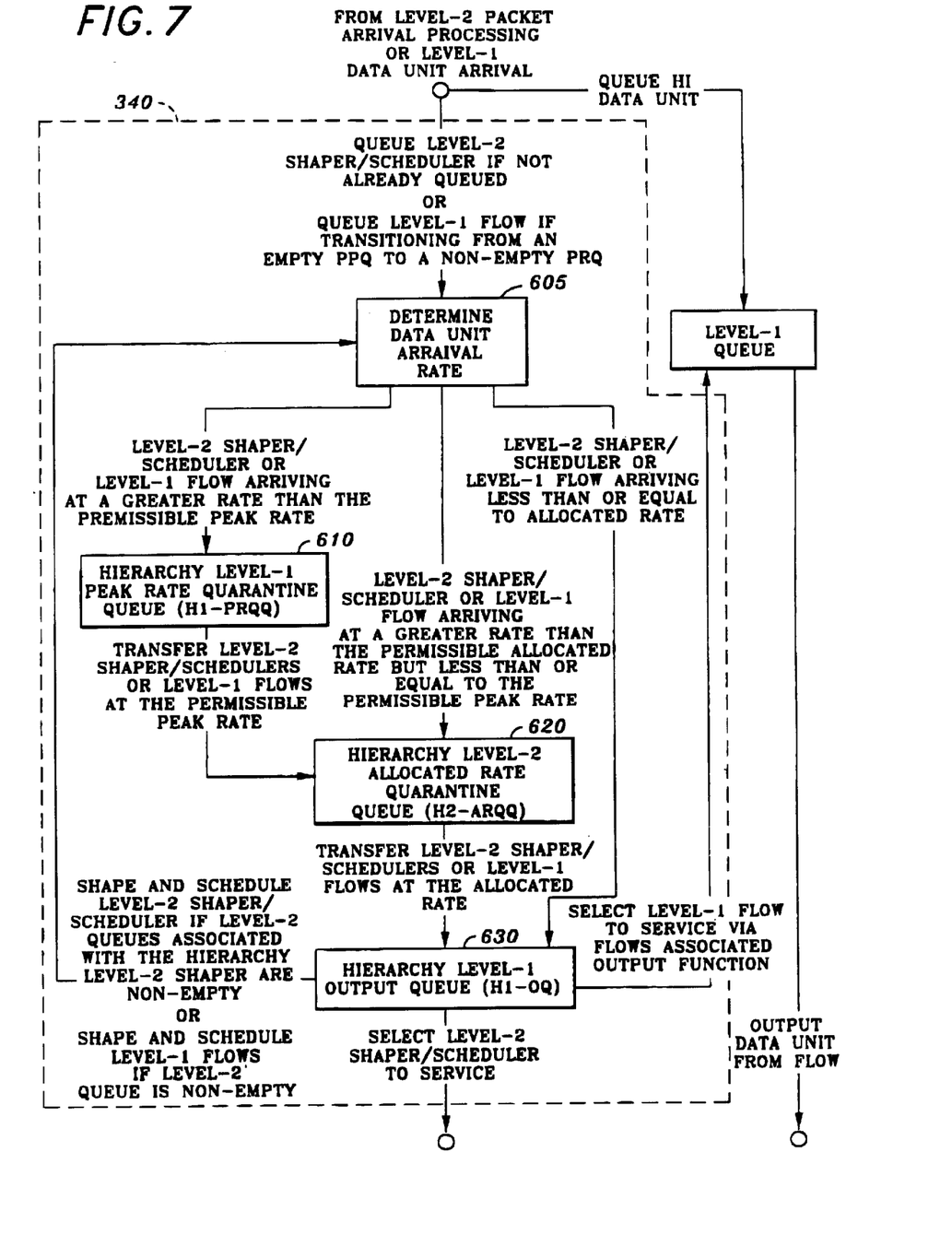
FIG. 7 illustrates a functional block diagram of the level-1 shaper/scheduler 340 and the corresponding level-1 queue according to one embodiment of the present invention.

FIG. 7 illustrates a functional block diagram of the level-1 shaper/scheduler 340 and the corresponding level-1 queue 320 according to one embodiment of the present invention. Referring to FIG. 7, the level-1 shaper/scheduler 340 includes a hierarchy level-1 peak rate quarantine queue ("H1-PRQQ") 610, a hierarchy level-1 allocated rate quarantine queue ("H1-ARQQ") 620, and a hierarchy level-1 output queue ("H1-OQ") 630. The level-1 shaper/scheduler 340 services flows of the level-2 shaper/schedulers 335 and level-1 flows. The level-2 shaper/scheduler, if not already queued, or level-1 flow is transferred to block 605 where the data unit arrival rate is determined.

For the level-2 shaper/scheduler, after data units are queued in the level-2 shaper/scheduler 335, the level-2 shaper/scheduler 335 itself is queued in the level-1 shaper/scheduler 340. If the level-2 shaper/scheduler 335 is already queued in the level-1 shaper/scheduler, then there is no further processing. If the level-2 shaper/scheduler 335 arrival is less than or equal to the allocated rate for the flow, the level-2 shaper/scheduler 335 is queued in the H1-OQ 630. Otherwise, if the comparison is less than or equal to the permissible peak rate for the flow, the level-2 shaper/scheduler 335 is queued in the H1-ARQQ 620. The level-2 shaper/scheduler is held in the H1-ARQQ 620 until the difference between the current flow timestamp and the last cell departure timestamp is equal to the allocated inter-cell rate, as determined by the "no rush" condition. At that time, it is transferred to the H1-OQ 630. At block 605, if the comparison is greater than the permissible peak rate for the flow, the level-2 shaper/scheduler is queued in the H1-PRQQ 610 where it is held until the difference between the current flow timestamp and the last cell departure timestamp is equal to the permissible inter-cell peak rate, at which time it is transferred to the H1-ARQQ 620. The H1-OQ 630 is serviced every output transmission service period. The service period is a period of time that it takes to transmit a data unit. The level-2 shaper/schedulers compete for the next data unit transmission time and the level-2 shaper/scheduler with the earliest timestamp deadline in the H1-OQ 630 is the shaper/scheduler to be serviced. The level-2 shaper/scheduler is serviced by invoking the level-2 shaper/scheduler's output function to output a data unit.

For level-1 flows, the level-1 shaper/scheduler 340 operation is similar to the level-2 shaper/scheduler 335 operation.

Figures 8, 8A:
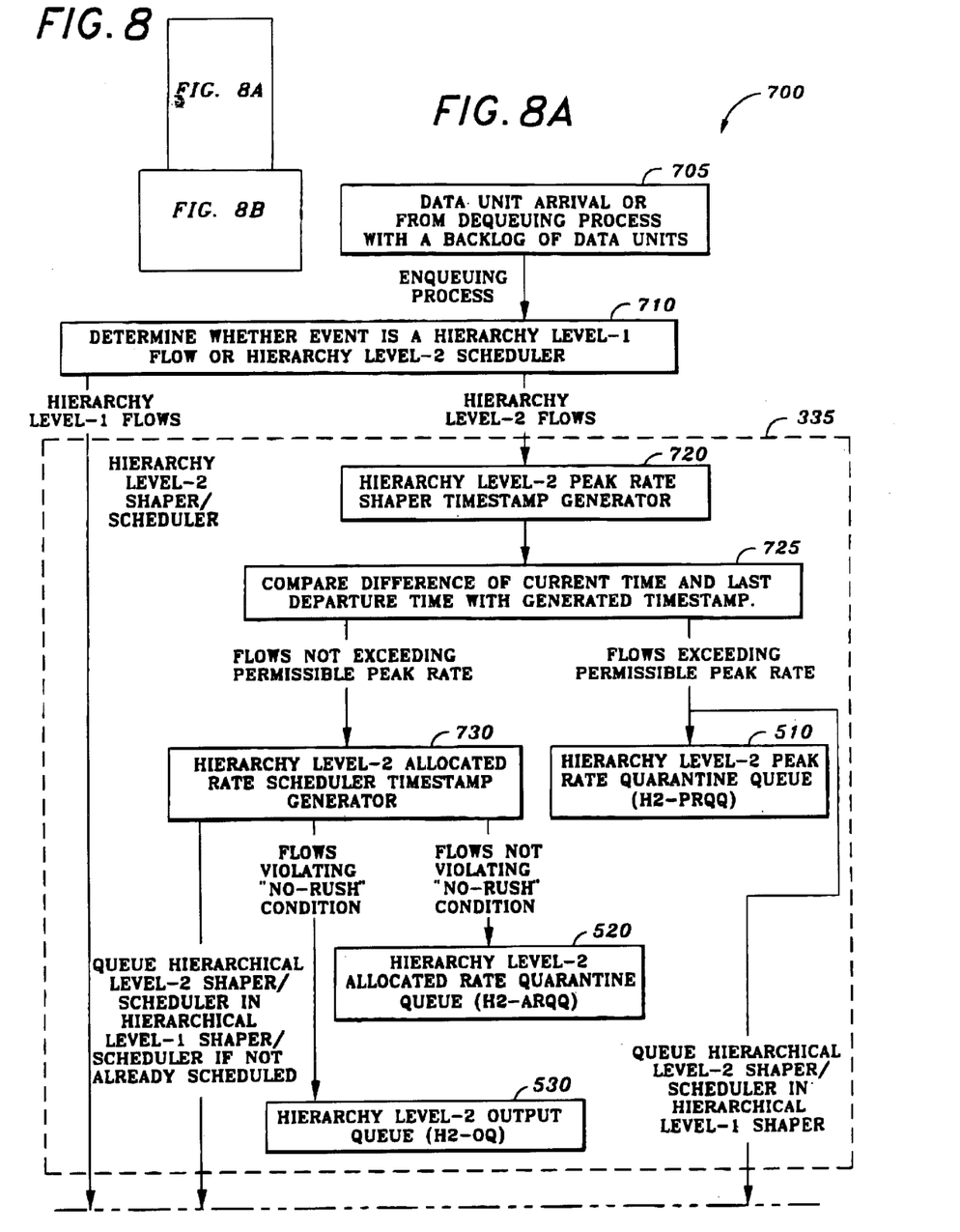
FIGS. 8A and 8B illustrate an enqueuing process of the two-tiered hierarchy shaper/scheduler of FIG. 2, according to one embodiment of the present invention.
Figure 8B:
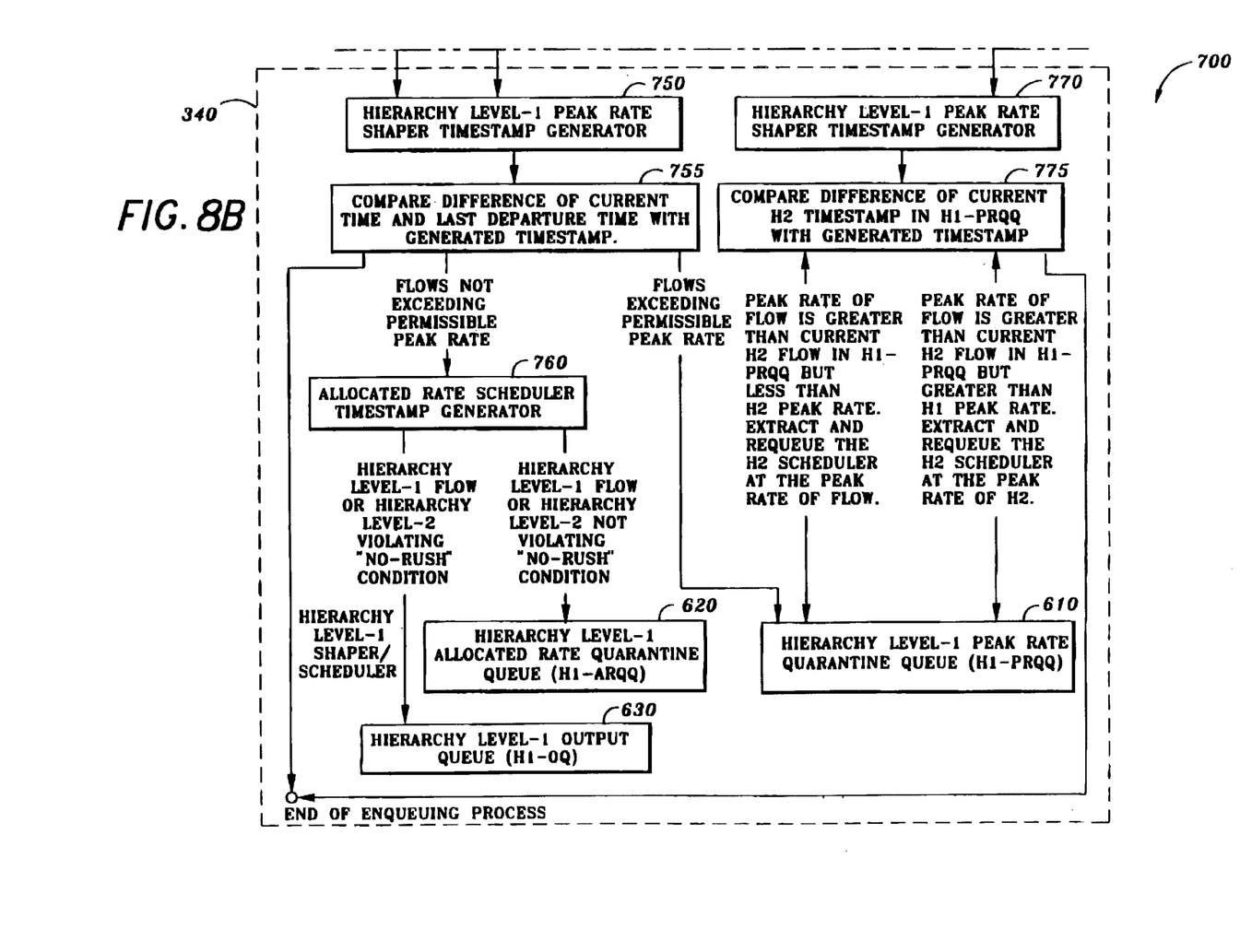

FIGS. 8A and 8B illustrate (FIG. 8) an enqueuing process 700 of the two-tiered hierarchy shaper/scheduler 238 of FIG. 2, according to one embodiment of the present invention. Referring to FIG. 8, upon a data unit arrival or an arrival from the dequeuing process with a backlog of data units, the flow is forwarded to block 710 where a determination is made as to whether the flow is a level-1 flow or a level-2 flow.

For (single-tiered) level-1 flows, the flow bypasses the hierarchy level-2 shaper/scheduler 335 and is passed directly to the hierarchy level-1 shaper/scheduler 340. At the hierarchy level-1 shaper/scheduler 340, a timestamp is generated for the flow using a peak rate shaper timestamp generator (block 750). The flow then moves to block 755 where the difference between the current time and the last departure time is determined. If the flow exceeds the permissible peak rate, the flow is moved into the H1-PRQQ 610 and is ineligible for output. However, if the flow does not exceed the permissible peak rate, a timestamp is generated for the flow using an allocated rate scheduler timestamp generator (block 760). For ATM, the timestamp generator assigns timestamps to values based upon the ATM VCC connection type. Although for ATM, UBR actually has zero minimum rate, in one embodiment, the smallest possible rate is assigned to the connection. Assigning minimal bandwidth to UBR connections avoids complicating the shaper/scheduler algorithm. Thus, some bandwidth allocation keeps UBR connections from being starved indefinitely.

Once a timestamp has been calculated for the flow, the flow is queued in either the H1-ARQQ 620 or the H1-OQ 630 depending upon a test to see if the flow is violating a "no-rush" condition. The "no-rush" condition tests to see if a flow arrival rate is greater than its allocated rate. If the flow arrival rate is greater than the allocated rate, the flow is queued in the H1-ARQQ 620, otherwise it is queued in the H1-OQ 630 for transmission on the link.

For hierarchy level-2 flows, the flow is passed to the hierarchy level-2 shaper/scheduler 335. At the hierarchy level-2 shaper/scheduler 335, a timestamp is generated for the flow using a peak rate shaper timestamp generator (block 720). The flow then moves to block 725 where the difference between the current time and the last departure time is determined. If the flow exceeds the permissible peak rate, the flow is moved into the H2-PRQQ 510 and is ineligible for output.

Since the flow is not eligible for output, if not already queued, the hierarchy level-2 shaper/scheduler 335 is queued in the hierarchy level-1 shaper/scheduler 340. If the flow timestamp has an earlier deadline than the hierarchy level-2 shaper/scheduler 335 timestamp that is contained the hierarchy level-1 shaper/scheduler 340 and the hierarchy level-2 shaper/scheduler 335 is queued in the level-1 shaper/scheduler's H1-PRQQ 610, then the level-2 shaper/scheduler 335 is removed from and re-queued in the H1-PRQQ 610 with the earlier deadline timestamp. The level-2 shaper/scheduler 335 is not queued in the H1-PRQQ 610 with a peak rate that is greater than the peak rate assigned to the level-2 shaper/scheduler. For example, if the level-2 shaper/scheduler, having a peak interval of $1/10$ data units, is queued in the H1-PRQQ, and a subsequent flow is received in the H2-PRQQ having a peak interval of $1/8$, the level-2 shaper/scheduler will not be re-queued. However, if a flow, having a peak interval of 1/20, is received in the H1-PRQQ, causing the level-2 shaper/scheduler to be queued in the H1-PRQQ at an interval of 1/20, and a subsequent flow is received in the H2-PRQQ at a peak interval of 1/8, then the level-2 shaper/scheduler will get re-queued in the H1-PRQQ at a peak interval of 1/10.

At block 725, if the flow does not exceed the permissible peak rate, a timestamp is generated for the flow using an allocated rate scheduler timestamp generator (block 730). For ATM, the timestamp generator assigns timestamps to values based upon the ATM VCC connection bandwidth parameters. The flow is then queued in either the H2-ARQQ 520 or the H2-OQ 530. In addition, the hierarchical level-2 shaper/scheduler 335 itself is queued in the hierarchy level-1 shaper/scheduler. The hierarchy level-1 shaper/scheduler generates a timestamp for the hierarchy level-2 shaper/scheduler using the level-1 peak rate shaper timestamp generator (block 750). For ATM, the timestamp generator assigns timestamps to values based upon the ATM VPC connection bandwidth parameters. The process for the hierarchy level-2 shaper/scheduler is the same for a level-1 flow as described above.

Figures 9, 9A:
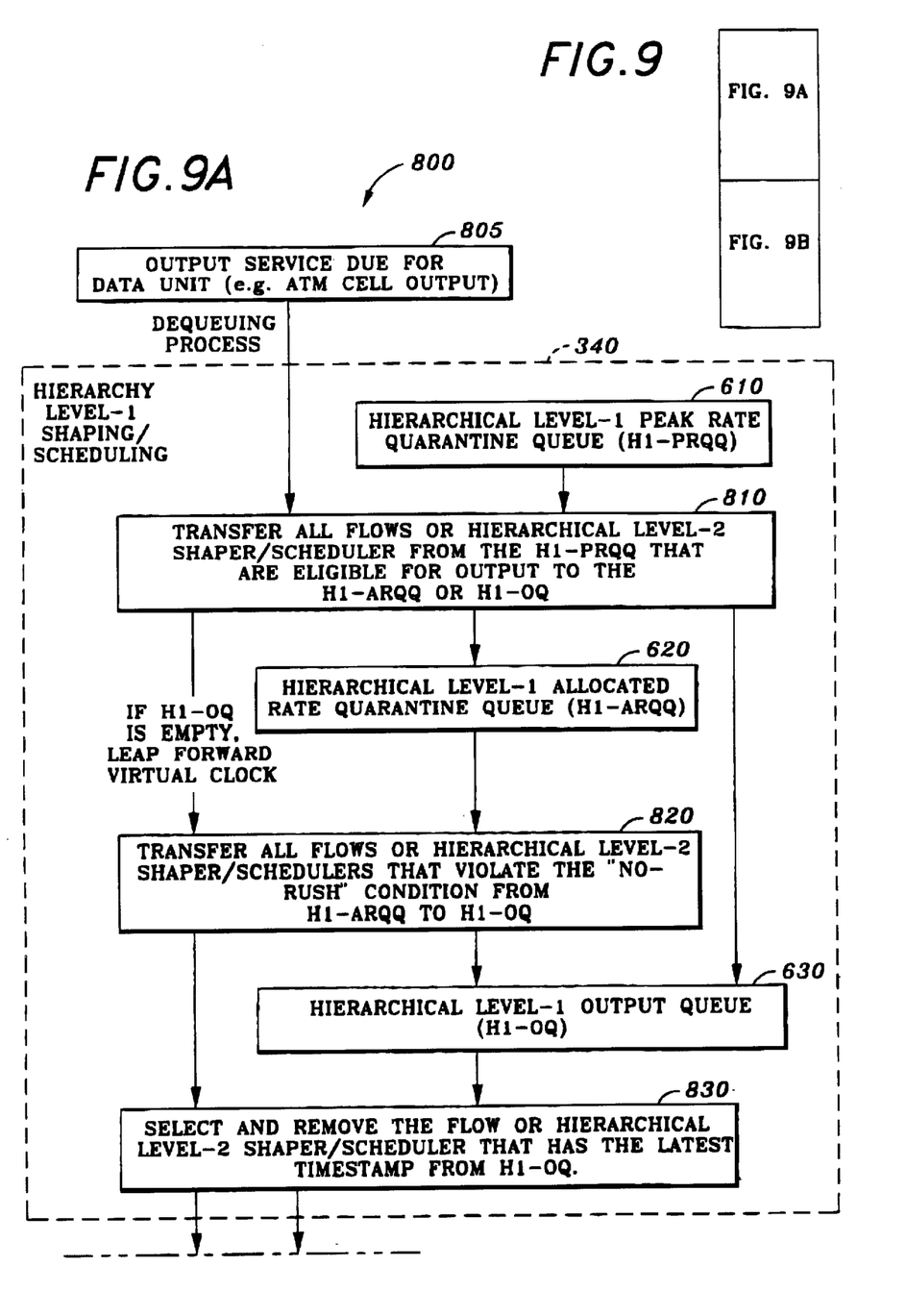
FIGS. 9A and 9B illustrate a dequeuing process of the two-tiered hierarchy shaper/scheduler of FIG. 2, according to one embodiment of the present invention.
Figure 9B:
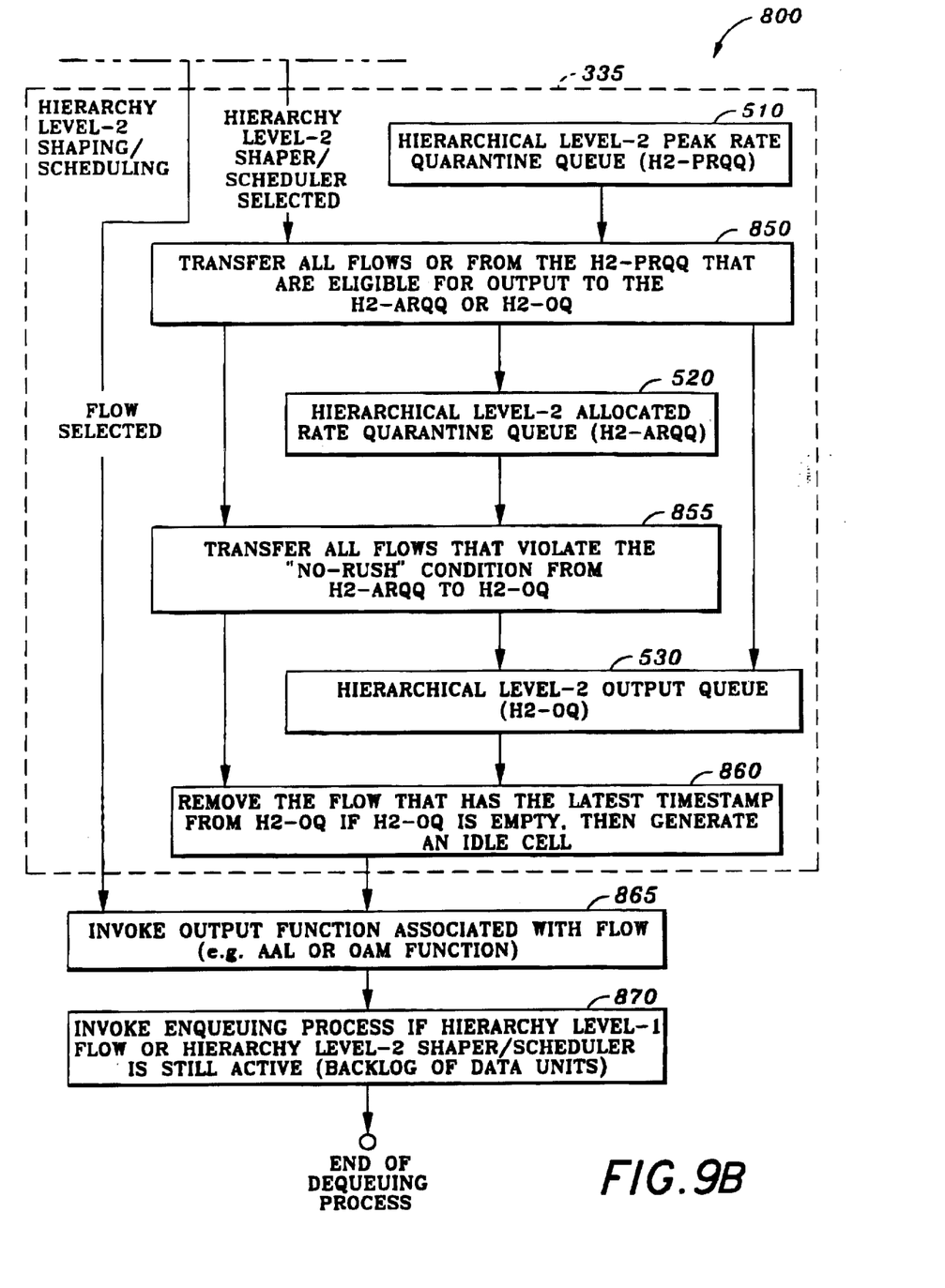

FIGS. 9A and 9B illustrate (FIG. 9) a dequeuing process 800 of the two-tiered hierarchy shaper/scheduler 238 of FIG. 2, according to one embodiment of the present invention. The dequeuing process 800 commences at block 805 where there is an output service request for a data unit. If the H1-OQ 630 is empty, the server time is advanced to the least timestamp value in H1-ARQQ 620. The hierarchy level-1 shaper/scheduler 340 then transfers all eligible hierarchy level-1 flows or hierarchy level-2 shaper/schedulers from the H1-PRQQ 610 to the H1-ARQQ 620 depending upon the peak rate condition (block 810), and the H1-ARQQ 620 to the H1-OQ 630 depending upon the no-rush condition. Then the hierarchy level-1 flows or the hierarchy level-2 shaper/scheduler with the earliest deadline timestamp in the H1-OQ 630 is selected. If there are no active flows or hierarchy level-2 shaper/schedulers, then a no data unit event is generated and the output function is invoked. For example, in the case of ATM, an idle cell is generated for output. For hierarchy level-1 flows, the hierarchy level-2 shaper/scheduler 335 is bypassed and the output function associated with the hierarchy level-1 flow (block 865) is invoked.

For hierarchy level-2 shaper/schedulers, the selected hierarchy level-2 shaper/scheduler 335 is invoked. The hierarchy level-2 shaper/scheduler 335 proceeds in a similar fashion as the hierarchy level-1 shaper/scheduler 340 by transferring flows from the H2-PRQQ 510 to the H2-ARQQ 520, and transferring flows from the H2-ARQQ 520 to the H2-OQ 530. Then the H2-OQ 530 is scanned for the flow with the earliest deadline timestamp. For the flow selected, the flow's associated output function is invoked. After the output function has completed, if the associated hierarchy level-1 flow or hierarchy level-2 shaper/scheduler is still active (has more data units queued), the enqueuing process 700 is invoked.

It must be noted that the no-rush condition may be modified so that the flow to be serviced is greater than its allocated rate for a short period of time, at a cost of slight unfairness to other flows. This enables trading off computational complexity to short-term fairness for a large number of flows.

Intended advantages of the embodiments of the queuing module 200 over Weighted Fair Queuing (WFQ) are numerous. In WFQ, computational complexity is on the order of N (O(N)) per packet transmission where "N" is the number of flows managed. The complexity of WFQ precludes it from being a practical solution for a large number of flows and/or high-speed interfaces. For all practical purposes, WFQ is excluded from any software-based implementations for a large number of flows or high-speed interfaces. The computational complexity of the queuing module 200 of the present invention is O(log(logN)) per packet transmission. Moreover, the present invention is scalable to high rates that typically have a large number of flows, making it a candidate for Gigabit interface speeds.

WFQ exhibits burstiness over short intervals causing an oscillatory behavior that is undesirable for feedback based congestion control. Thus, WFQ is not inherently compatible with ABR ATM services. The queuing module smoothes out burstiness, making it an ideal candidate for ABR. Moreover, the queuing module smoothing characteristics provides a better "fairness index" than WFQ.

WFQ uses weights for flows. The weights are relative to the link speed. The present invention allocates bandwidth that is compatible with traffic contracts provided by WAN services. Moreover, the present invention immediately adapts to changes in link rate. This is important for inverse multiplexing over AT ("IMA") where individual physical links may come in and out of service. It is also important for offering various virtual connection traffic contracts within VBR or ABR virtual path services. Since WFQ uses weights for flows, it cannot provide bandwidth allocation service guarantees as available bandwidth changes.

The present invention is further extensible to add support to control cell delay variations for delay-variation sensitive flows such as AAL1 CBR flows. WPQ has no such extensibility.

Since The present invention timestamps data unit arrivals and departures, it inherently supports service level agreement ("SLA") measurements. Time-stamping mechanisms must be used in addition to WFQ for support of SLAs, further increasing the computational complexity of WFQ. Furthermore, due to the extreme computational complexity of WFQ, it is not practical to implement WFQ in a hierarchical arrangement.

Moreover, the present invention integrates shaping and scheduling to keep the overall shaping and scheduling computation complexity to O(log(logN)). Since WFQ does not allocate peak rate bandwidth to connections, it cannot be used for shaping. Other mechanisms must be used in addition to WFQ to make the flows conforming to ATM traffic contracts of service providers.

WFQ does not scale for a large number of connections. WFQ searches for 65,536 active virtual connections require a maximum search depth of 65,536. The present invention scales for a large number of virtual connections. That is, searches for 65,536 active virtual connections can be accomplished with a maximum search depth of four (4). Queue searches for 4,000,000,000 active virtual connections can be accomplished with a maximum search depth of five (5).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of shaping/scheduling flows in a communication device, comprising:
   determining an arrival rate of a data unit associated with a flow;
   placing the flow in a peak rate queue if the data unit arrives at a greater rate than a permissible peak rate;
   placing the flow in an allocated rate queue if the data unit arrives at a greater rate than an allocated rate but less than or equal to the permissible peak rate; and
   placing the flow in an output queue if the data unit arrives at a rate less than or equal to the allocated rate.

2. The method of claim 1 wherein prior to determining the arrival rate of the data unit associated with the flow, the method comprises placing the data unit in a queue.

3. The method of claim 1 wherein determining the arrival rate of the data unit comprises comparing an arrival time of the data unit with a departure time of a last data unit for the flow.

4. The method of claim 1 further comprising transferring the flow from the peak rate queue to the allocated rate queue if a difference between a current flow timestamp and a last data unit departure timestamp for the flow is equal to or less than the permissible peak rate of the flow.

5. The method of claim 1 further comprising transferring the flow from the allocated rate queue to the output queue if a difference between a current flow timestamp and a last data unit departure timestamp for the flow is equal to or less than the allocated rate of the flow.

6. The method of claim 1 further comprising selecting the flow for output by invoking an output function associated with the flow.

7. The method of claim 6 further comprising reshaping/rescheduling the flow if the flow has more data units to transmit.

8. The method of claim 6 wherein placing the flow in a peak rate queue if the data unit arrives at a greater rate than a permissible peak rate comprises placing the flow in the peak rate queue if the data unit arrives at a greater rate than the permissible peak rate, wherein flows in the peak rate queue are ineligible for output.

9. The method of claim 6 wherein placing the flow in an allocated rate queue if the data unit arrives at a greater rate than an allocated rate but less than or equal to the permissible peak rate comprises placing the flow in the allocated rate queue if the data unit arrives at a greater rate than the allocated rate but less than or equal to the permissible peak rate, wherein flow in the allocated rate queue are ineligible for output.

10. A communications device, comprising:
    a processor having a processing unit; and
    a memory module coupled to the processor, the memory module having instruction sequences to cause the processor to,
       determine an arrival rate of a data unit associated with a flow,
       place the flow in a peak rate queue if the data unit arrives at a greater rate than a permissible peak rate,
       place the flow in an allocated rate queue if the data unit arrives at a greater rate than an allocated rate but less than the permissible peak rate, and
       place the flow in an output queue if the data unit arrives at a rate less than the allocated rate.

11. The system of claim 10 wherein the processor to further place the data unit in a queue.

12. The system of claim 10 wherein the processor to further transfer the flow from the peak rate queue to the allocated rate queue if a difference between a current flow timestamp and a last data unit departure timestamp for the flow is equal to the permissible peak rate of the flow.

13. The system of claim 10 wherein the processor to further transfer the flow from the allocated rate queue to the output queue if a difference between a current flow timestamp and a last data unit departure timestamp for the flow is equal to the allocated rate of the flow.

14. The system of claim 10 wherein the processor to further select the flow for output by invoking an output function associated with the flow.

15. The system of claim 11 wherein the processor to further reschedule the flow if the flow has more data units to transmit.

16. The system of claim 11 wherein flows in one or both of the peak rate queue and the allocated queue are ineligible for output.

17. A method of shaping/scheduling flows in a communication device, comprising:
    detecting an arrival of a data unit;
    determining whether the data unit is associated with a level-1 flow or a level-2 flow;
    placing the data unit in a level-1 queue or a level-2 queue if the data unit is associated with the level-1 flow or a level-2 flow, respectively;
    queuing the level-2 flow in a level-2 shaper/scheduler;
    queuing the level-1 flow in a level 1 shaper/scheduler; and
    queuing the level-2 shaper/scheduler in the level-1 shaper/scheduler.

18. The method of claim 17 wherein queuing the level-2 flow in a level-2 shaper/scheduler comprises:
    placing the flow in a peak rate queue of the level-2 shaper/scheduler if the data unit arrives at a greater rate than a permissible peak rate;
    placing the flow in an allocated rate queue of the level-2 shaper/scheduler if the data unit arrives at a greater rate than an allocated rate but less than the permissible peak rate, and
    placing the flow in an output queue of the level-2 shaper/scheduler if the data unit arrives at a rate less than the allocated rate.

19. The method of claim 18 further comprising:
    selecting the level-2 shaper/scheduler for output; and
    responsive to selecting the level-2 shaper/scheduler for output, selecting the level-2 flow for output by invoking an output function associated with the level-2 flow if the level-2 flow is located in the output queue of the level-2 shaper/scheduler.

20. The method of claim 17 wherein queuing the level-1 flow in a level-1 shaper/scheduler comprises:
    placing the flow in a peak rate queue of the level-1 shaper/scheduler if the data unit arrives at a greater rate than a permissible peak rate;
    placing the flow in an allocated rate queue of the level-1 shaper/scheduler if the data unit arrives at a greater rate than an allocated rate but less than the permissible peak rate, and
    placing the flow in an output queue of the level-1 shaper/scheduler if the data unit arrives at a rate less than the allocated rate.

21. The method of claim 20 further comprising selecting the level-1 flow for output by invoking an output function associated with the level-1 flow if the level-1 flow is located in the output queue of the level-1 shaper/scheduler.

* * * * *